(No Model.)
D. J. O'DONNELL.
CAB.
No. 479,300. Patented July 19, 1892.
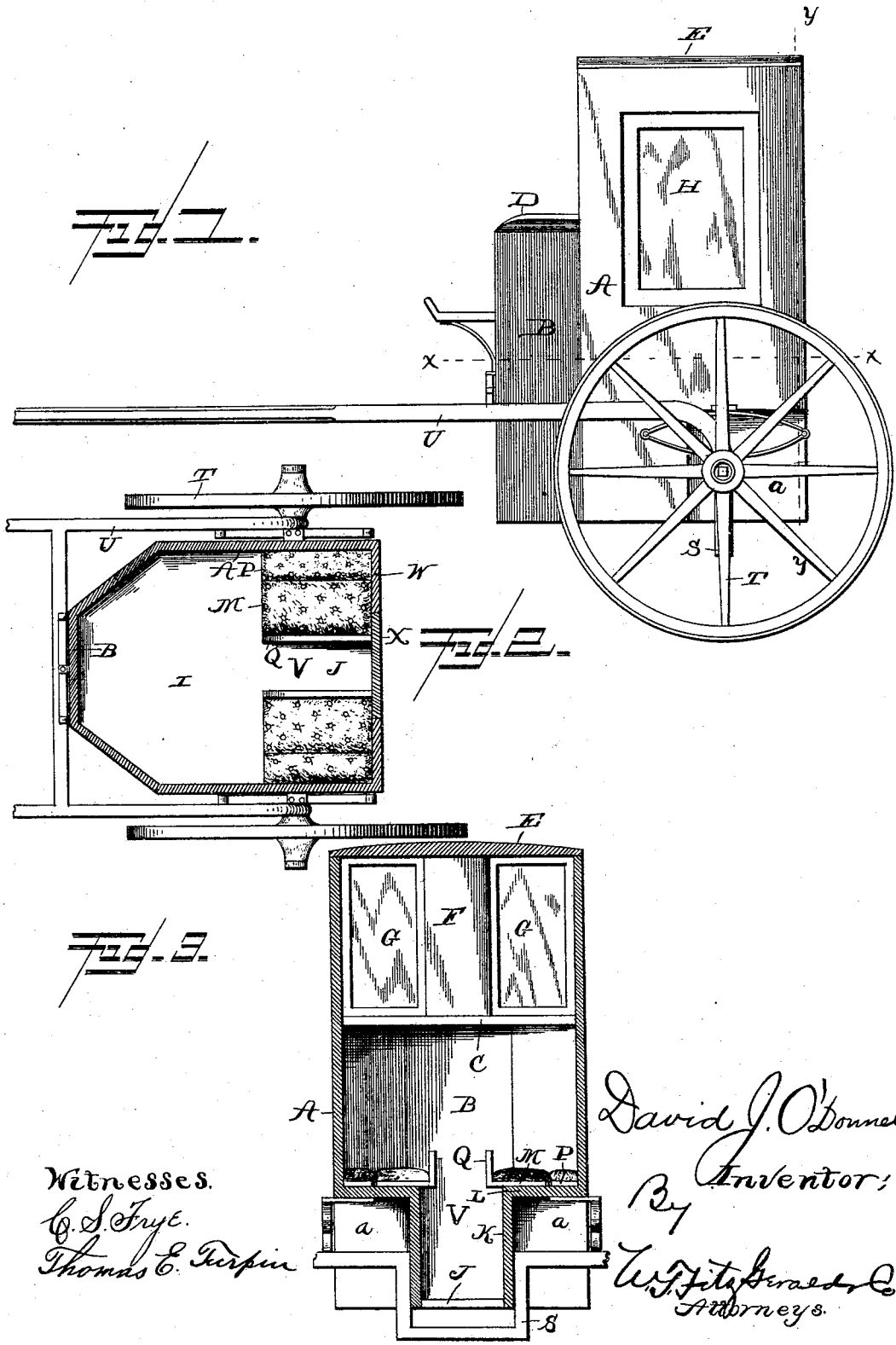
Witnesses.
C. S. Frye.
Thomas E. Turpin
David J. O'Donnell
Inventor;
By
W. T. FitzGerald & Co.,
Attorneys.

UNITED STATES PATENT OFFICE.

DAVID J. O'DONNELL, OF GRAFTON, NEBRASKA.

CAB.

SPECIFICATION forming part of Letters Patent No. 479,300, dated July 19, 1892.

Application filed March 15, 1892. Serial No. 424,996. (No model.)

*To all whom it may concern:*

Be it known that I, DAVID J. O'DONNELL, a citizen of the United States, residing at Grafton, in the county of Fillmore and State of Nebraska, have invented certain new and useful Improvements in Cabs or Two-Wheeled Vehicles; and I do hereby declare the following to be a full, clear, and exact description of the invention, such as will enable others skilled in the art to which it appertains to make and use the same.

My invention has relation to improvements in cabs or two-wheeled vehicles; and it consists in the peculiar construction, certain novel combinations, and the adaptation of parts hereinafter described, and particularly pointed out in the claim appended.

In the accompanying drawings, Figure 1 is a side elevation of my improved cab. Fig. 2 is a horizontal section of the same, taken in the plane indicated by the line $x\ x$ of Fig. 1; and Fig. 3 is a vertical transverse section taken in the plane indicated by the line $y\ y$ on Fig. 1, looking toward the front of the cab.

In the said drawings similar letters designate corresponding parts throughout the several views, referring to which—

A indicates the side walls of my improved cab-body, which are of a general rectangular form, as illustrated, and are provided at their lower rear corners with angular notches $a$, for a purpose presently disclosed.

B indicates the front wall of my improved cab, which is bent or bowed, as illustrated, and extends from the bottom of the body to an intermediate point in the height thereof.

Suitably connected to the front wall B at the upper end thereof is a horizontal wall C, which is also connected to the side wall A and serves to support the driver's seat D, which may be of the ordinary or any approved form. Connected to the upper edge of the side walls A and supported thereby is the top E, which is preferably curved slightly, as shown. Rising from the horizontal wall C and connected at its upper end to the top E is a transversely-disposed wall F, which, in addition to assisting in the support of the top E, serves as a back-rest for the driver. This transversely-disposed wall F, which is preferably of the proportional size illustrated, serves, in conjunction with the side walls A, the top E, and the horizontal wall C, to form frames for the front windows G, which are preferably of the proportional size and rectangular form illustrated.

Formed in the side walls A of the cab are the side windows H, which are preferably of a rectangular form, as illustrated. By the provision of the side windows H and the front windows G it will be readily perceived that not only will the cab be very well lighted, but the passenger, who faces forwardly when seated, as presently described, will be enabled to see in front as well as at the side of the cab.

Suitably connected to the side and front walls of the cab at the lower edges thereof is the bottom I, which is provided at the middle of its rear edge with a rearwardly-extending reduced portion J, which is preferably of a general rectangular form, and is designed to form the bottom or floor of the cab-entrance.

Connected to and rising from the side edges of the reduced portion J of the floor or bottom are short vertical walls K, to the upper edge of which are connected the horizontal walls L, which are also connected to the side walls A and serve in practice to support the folding seats presently described.

Mounted and secured upon the horizontal walls L, at or adjacent to the side walls A, are ledges P, which are upholstered the same as the seats and form part of the same, to which are hinged or flexibly connected the folding seats M, which are supported in their horizontal position by the horizontal walls L, and when in such position extend partly across the entrance-passage V, formed by the walls K. These folding seats M are provided at their free edge with angular ledges or guards Q, equal in height to the width of ledges P, to which the seats are hinged, to prevent a person from slipping off the same, to cover over the space between the side wall of the vehicle and top of the seat when the latter is folded up, such space being of the width of ledge P, and by reason of said seats being adapted to fold or swing up against the side of the cab, it will be readily perceived that the entrance V may be made very narrow and an economy of space thereby effected, inasmuch as a person entering the cab may readily swing one or both seats up out of the entrance, and after entering the cab may return said seats to their normal position.

By the peculiar construction described it will be readily perceived that an abundance of room is afforded in front of the seats for the nether limbs of the passengers, who face forwardly when seated, which is a highly important desideratum.

Suitably connected to the side and top walls of the cab are the rear walls W, which rest on opposite sides of the entrance, which is normally closed by a swinging door, as X.

S indicates the axle of my improved cab, which is preferably connected by springs to the body thereof, and is provided with a rectangular drop portion, as better illustrated in Fig. 3 of the drawings, to conform to the side and bottom walls of the entrance V.

Mounted upon the axle S are the traveling wheels T, and suitably connected to said axle and extending forwardly therefrom are the thills or shafts U, which are also connected to the forward portion of the cab-body, so as to reduce the horse motion.

From the foregoing description, taken in conjunction with the accompanying drawings, it will be readily perceived that I have provided a cab having a very light and small body, embodying such a construction and arrangement of parts that the passengers will be enabled to face forwardly and an abundance of room will be afforded.

Although I have specifically described the construction and relative arrangement of the several elements of my improved cab, yet I do not desire to confine myself to the same, as such changes or modifications may be made as fairly fall within the scope of my invention.

Having thus described my invention, what I claim, and desire to secure by Letters Patent, is—

In a cab or two-wheeled vehicle, the combination, with the angular walls A L K, the bottom I, with reduced portion J, and the entrance V, of the sectional hinged seats M T, having ledges Q, the section P, secured to the wall L, with the movable section M, with its ledge extending over the sides of the entrance V, and the said ledges being adapted to engage the inner surfaces of the side walls A when thrown upward, substantially as and for the purposes specified.

In testimony whereof I affix my signature in presence of two witnesses.

DAVID J. O'DONNELL.

Witnesses:
  T. F. REAL,
  THOS. M. FISHER.